No. 855,556.
PATENTED JUNE 4, 1907.
J. W. AYLSWORTH.
DUPLICATE SOUND RECORD.
APPLICATION FILED MAY 31, 1906.

UNITED STATES PATENT OFFICE.

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

DUPLICATE SOUND-RECORD.

No. 855,556.

Specification of Letters Patent.

Patented June 4, 1907.

Application filed May 31, 1906. Serial No. 319,466.

*To all whom it may concern:*

Be it known that I, JONAS W. AYLSWORTH, a citizen of the United States, residing at 223 Midland avenue, East Orange, county of Essex, and State of New Jersey, have invented certain new and useful Improvements in Duplicate Sound-Records, of which the following is a description.

My invention relates to an improved duplicate sound record made of a tough, permanent material capable of receiving and retaining an absolutely accurate copy of a matrix, having no ingredient which will evaporate to effect the record surface (as is the case with camphor in celluloid), which will be practically non-inflammable and which will be sufficiently flexible to permit of its being collapsed when it is desired to remove the same from the matrix.

Duplicate sound records have heretofore been made of celluloid, but owing to the slow evaporation of the camphor, these records become minutely pitted in time, so as to present a rough and scratchy surface.

In an application filed on even date herewith, I describe an improved composition of a celluloid-like nature, said composition being based on the discovery that a halogenized fatty acid or derivative thereof, such as chlorinated stearic acid, acts as a solid solvent for pyroxylin or other cellulose esters, such as the esters of the acetic series, the compound being manufactured by the employment of a common solvent, such as acetone, which upon evaporation results in a celluloid-like composition having desirable properties of toughness, flexibility and non-inflammability, and being practically permanent, since the solid solvent does not evaporate, as is the case with camphor in celluloid.

My present invention relates to the production of a duplicate sound record of this improved material. The advantages of such a sound record are great toughness and smoothness of the record surface, absolute permanency thereof and substantial non-inflammability.

Reference is hereby made to the accompanying drawing which shows a conventional record tablet with the names of the ingredients of my improved composition applied thereto.

In producing the compound I first obtain a halogenized fatty acid or fatty acid derivative, as I describe in said application. For example, ordinary commercial stearic acid may be chlorinated for several days in the presence of a catalytic agent, such as iodin or antimony chlorid, until a more or less viscid, oily, or resinated solid body is secured, dependent upon the extent to which the chlorinating process is carried. The solvent thus secured is added in varying proportions to the desired cellulose body, such as pyroxylin and may actually exceed the quantity of the latter. The two bodies thus added together are now dissolved in a common solvent, such as acetone, to form a more or less viscid fluid solution, one having the limpidity of molasses being suitable for the purpose. Duplicate sound records are made of this material in any suitable way, either by forming tubes of the same and expanding such tubes under heat and pressure against the walls of the matrix, as is done with the manufacture of ordinary celluloid records at the present time, or by the special process described in my application for Letters Patent filed concurrently herewith. In the latter process the matrix is rapidly rotated and the solution introduced therein so as to be uniformly distributed against the matrix walls by the centrifugal force developed and thereby take an absolutely accurate impression of the record surface. In this distribution of the solution any air bubbles will be forced radially inward. After the solution has been thus distributed over the record surface of the rotating matrix which will require only a few seconds, the solvent is evaporated by blowing a blast of warm air through the matrix and preferably also by heating the matrix exteriorly so as to facilitate the evaporation. When the solvent has been entirely evaporated the record will exist on the interior of the walls as a continuous homogeneous cylindrical structure carrying an absolutely accurate representation of the record surface and may be removed from the matrix either by immersing the latter in hot water and collapsing the record inwardly or by chilling the matrix so as to cause the record to shrink radially and permit of its withdrawal.

Having now described my invention, what I claim as new and desire to secure by Letters Patent is as follows:—

1. A duplicate sound record composed of a composition of a cellulose ester and a halogenized fatty acid or derivative thereof, substantially as set forth.

2. A duplicate sound record composed of a composition of a cellulose ester and a chlorinated fatty acid or derivative thereof, substantially as set forth.

3. A duplicate sound record composed of a composition of a cellulose ester and halogenized stearic acid, substantially as set forth.

4. A duplicate sound record composed of a composition of a cellulose ester and chlorinated stearic acid, substantially as set forth.

5. A duplicate sound record composed of a composition of a cellulose ester of the acetic series and a halogenized fatty acid or derivative thereof, substantially as set forth.

6. A duplicate sound record composed of a composition of a cellulose ester of the acetic series, and halogenized stearic acid, substantially as set forth.

7. A duplicate sound record composed of a composition of a cellulose ester of the acetic series, and chlorinated stearic acid, substantially as set forth.

This specification signed and witnessed this 29th day of May 1906.

JONAS W. AYLSWORTH.

Witnesses:
 FRANK L. DYER,
 ANNA R. KLEHM.